United States Patent
Kullenberg et al.

Patent Number: 6,142,668
Date of Patent: Nov. 7, 2000

[54] X-RAY MULTIMETER

[76] Inventors: Ragnar Kullenberg, Sandvägen 4, S-310 42 Haverdal; Anders Ullberg, Berghällavägen 4, S-616 33 Åby, both of Sweden

[21] Appl. No.: 09/147,985

[22] PCT Filed: Sep. 9, 1997

[86] PCT No.: PCT/SE97/01511

§ 371 Date: May 3, 1999

§ 102(e) Date: May 3, 1999

[87] PCT Pub. No.: WO98/13706

PCT Pub. Date: Apr. 2, 1998

[30] Foreign Application Priority Data

Sep. 25, 1996 [SE] Sweden .................................. 9603499

[51] Int. Cl.[7] .................................. G01T 1/29; H05G 1/26
[52] U.S. Cl. .................................. 378/207; 378/117
[58] Field of Search .................................. 378/207, 117, 378/118

[56] References Cited

U.S. PATENT DOCUMENTS 3,833,810  9/1974  Efanov et al. .
4,472,728  9/1984  Grant et al. .
4,520,495  5/1985  Tanaka .................................. 378/117
5,077,773  12/1991  Sammon .................................. 378/207

FOREIGN PATENT DOCUMENTS 0 282 466   9/1988   European Pat. Off. .
454 390     4/1988   Sweden .
2 288 961  11/1995   United Kingdom .
WO 94/23458 10/1994  WIPO .
WO 95/14941  6/1995  WIPO .

*Primary Examiner*—David P. Porta
*Assistant Examiner*—Drew A. Dunn
*Attorney, Agent, or Firm*—Merchant & Gould P.C.

[57] ABSTRACT

A method and device for detecting and analyzing X-ray radiation with a detector unit which is placed in connection with the X-ray radiation. The detection unit is connected to a processing unit for processing the information which is received from the detection unit. The detection unit is placed directly in the radiation field of the X-ray radiation, and the detection unit is in the form of a matrix or a vector provided with one of more detector elements. The processing unit processes the information which is obtained from each detector element in the detection unit. In addition, a collimator is arranged in front of the detection unit, with the collimator being formed such that the radiation is reproduced substantially in dot form on the detector element.

5 Claims, 4 Drawing Sheets

X-RAY MULTIMETER

TECHNICAL FIELD

The present invention relates to a method and a device for detecting and analysing X-ray radiation.

BACKGROUND OF THE INVENTION

When using X-ray radiation on patients, the radiation dosages is always an important and limiting factor since the X-ray dosage always presents a risk of injury to the patient. Particularly during mammography screening, the X-ray dosage to the patient is an important factor in the evaluation of the benefit of the treatment. An accurate quality control of the X-ray equipment is therefore most important in order to be able to maintain the radiation dosages at a low level. It is normal during mammography to radiate at a relatively low acceleration voltage across the X-ray tube, for example between 25 and 30 kVp. This can lead to difficulties since the beam quality is determined by conventional technology which is adapted for considerably higher acceleration voltages. At the same, the beam quality, which for example can be determined by analysing the spectral distribution of the radiation from the X-ray tube, is a decisive factor for the radiation dosage to the breast as well as for the image quality in general.

The type of equipment which is used in order to evaluate the quality of X-ray radiation consists in most cases of many apparatuses and are generally very expensive. It would thus be desirable to be able to determine those parameters which can be suitable in order to determine the quality of X-ray and mammography equipment as a matter of routine. The parameters can for example include the appearance of an X-ray spectrum, the maximum tube voltage across the X-ray tube, the dosage velocity from the X-ray tube, the function of the X-ray tube and the X-ray generator, the resolution of the X-ray tube, the modulation transfer functions, the exposure time, etc.

The photon fluence from an X-ray tube which is used within medical radiology is very high. In order to be able to analyse photon energy spectra in a primary beam from a conventional X-ray tube, it is therefore often necessary to use very fine collimation of the beam (0.025–0.5 mm), as well as a focus-detector spacing of several meters. This implies that the measuring procedure is lengthy and time consuming.

A method for determining the appearance of an X-ray spectrum has been developed at the University of Linköping (see SE 454 390, Matscheko and Ribberfors 1987). This can be done by measuring the dispersed radiation from a secondary distributor, a so-called Compton spectrometer, and thereafter estimating how the spectra look. This method would seem to very expensive since, on the one hand, it requires semi-conductor detectors which require cooling, for example using liquid nitrogen, and, on the other hand, advanced pulse measurement equipment. In addition, the apparatus can be said to be rather bulky because of its size and weight.

Another method for detecting X-ray radiation is known from U.S. Pat. No. 4,472,728 which describes an X-ray spectrometer based on a semi-conductor matrix for improved energy and spatial resolution. However, U.S. Pat. No. 4,472,728 shows only how the semi-conductor matrix itself is constructed and not how the actual measuring can be performed.

A further method for detecting X-ray radiation is described in SE-C2-502 298 which describes a method for determining the size and/or position of the focus of an X-ray tube. This is achieved by guiding the radiation from the X-ray tube through a slot. The image of the beam which is generated by guiding the beam through the slot is detected with the aid of linear detector elements which are arranged parallel to the slot so that the distribution of the radiation source in the transverse direction of the slot can be reproduced or measured. However, the incident radiation through the slot will be deflected and thus that radiation which is distributed in the surrounding air will also be detected. This implies, therefore, that the distributed radiation can no longer be attributed to the X-ray tube. The reason for this phenomenon is primarily because a slot is an elongate opening and contributes to reduced accuracy during measuring.

SUMMARY OF THE INVENTION

It is therefore an object to the present invention to provide a method and a device which increases the accuracy of measurement and simplifies the measurement of various parameters which can arise in connection with X-ray radiation. The parameters can, for example, be the appearance of an X-ray spectrum, maximum tube voltage across the X-ray tube, the dosage velocity from the X-ray tube, the function of the X-ray tube and the X-ray generator, the exposure time, etc.

The expression "maximum tube voltage across the X-ray tube" means the highest energy in the X-ray spectrum. The dosage velocity from the X-ray tube is proportional to the area beneath the X-ray spectrum. The function of the X-ray tube and the X-ray generator can be analysed from the appearance of the spectrum, i.a. it is possible to study how the low energy portion of the spectrum looks and whether the spectrum contains any discontinuities. The exposure time is the time between commencement of the registration of the radiation and when it ceases.

A further object is that the device should be portable, i.e. small in size and weight.

In accordance with the present invention, the above-mentioned objects are achieved via a method for determining the condition of an X-ray tube after a certain operating time. The method includes steps of recording the energy spectrum of the X-ray tube, calculating a value from the gradient of the curve in its low-energy region, and calibrating the calculated value of the gradient by comparing the aforementioned value with a corresponding gradient value calculated from a new X-ray tube.

The above-mentioned objects are also achieved through a device for determining the condition of an X-ray tube after a certain operating time. The device includes a detector that is connected to a calculating unit that can be inserted into the radiation beam of the X-ray tube, wherein the detector can generate signals in response to the instantaneous intensity, i.e. energy content, of the X-radiation. The calculating unit is designed to calculate from the aforementioned signal the energy spectrum, i.e. the number of X-ray pulses, of the X-ray tube as a function of the voltage across the X-ray tube. The arrangement also includes a memory capable of storing an energy spectrum obtained from the radiation from a new X-ray tube, as well as a comparison arrangement designed to compare the energy spectrum curve from the new tube as well as from the tube that has been operating for a certain time.

Preferred embodiments of the method and the device in accordance with the invention are detailed in the respective dependent claims.

BRIEF DESCRIPTION OF THE DRAWINGS

The invention will be described in greater detail in the following description of a preferred embodiment shown by way of example with reference to attached drawings in which.

DETAILED DESCRIPTION OF PREFERRED EMBODIMENTS

Figure 1:
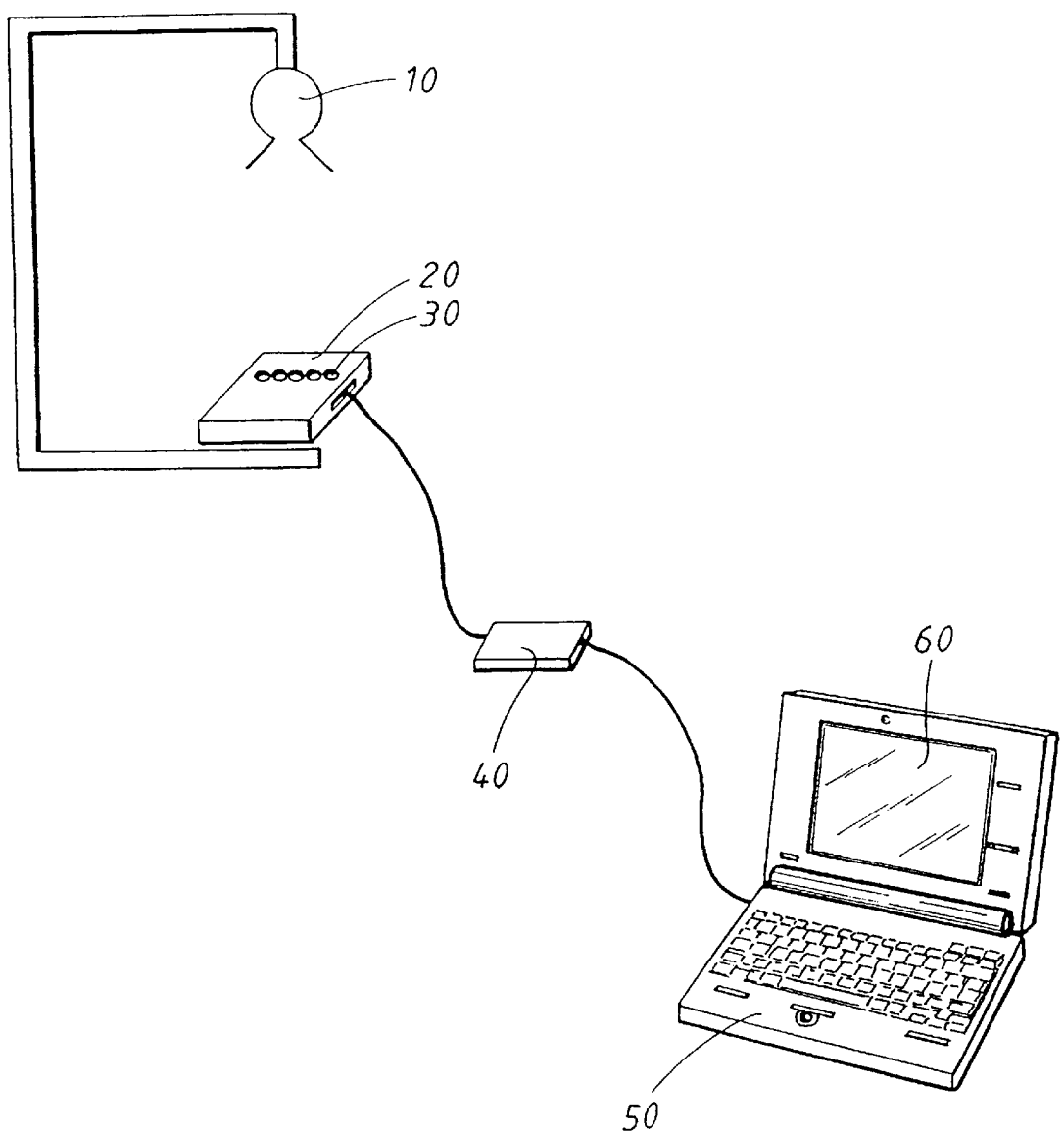
FIG. 1 shows an embodiment of a device for detecting and analysing X-ray radiation in accordance with the present invention.

With reference to FIG. 1, a device for detecting and analysing X-ray radiation in accordance with the present invention is shown. The device can be provided with one or more detector elements, not shown, which are arranged in connection with an X-ray tube 10 in order to detect the emitted X-ray radiation. The detection unit 20 can furthermore be connected to a processing unit 50 which, for example, can be in a form of a computer which is preferably portable in order to process the information which is obtained from the detection unit 20. Preferably, the detection unit is arranged directly in the radiation field of the X-ray radiation. In the case when signals which derive from the detection unit 20 are analogue and the processing unit is not provided with means for handling analogue signals, it can be suitable to arrange an analogue/digital converter (ADC) 40 between the detection unit 20 and the processing unit 50 in order to be able to process these signals.

The detection unit 20 can be in the form a matrix or a vector arranged with one or more detector elements. The expression "vector" means that the detector elements can be placed in a line one after another, whilst the expression "matrix" means that the detector elements can be placed in a plurality of rows after each other. The detector elements can for example be semi-conductor detectors. Furthermore, one or more collimators 30 can be arranged in front of the detection unit 20. If the detector elements of the detection unit 20 are in the form of a vector, it is possible to determine a plurality of parameters by means of the processing unit 50 so as to perform a quality control of, for example, X-ray and mammography equipment. In the second case in which the detector elements of the detection unit 20 are in the form of a matrix, it is furthermore possible to obtain via the processing unit 50 an X-ray image since, in this case, it can provide a suitably high resolution to be able to provide a visualisation of an object. It is also possible to a certain extent to obtain an image when the detector elements of the detection unit 20 are in the form of a vector, though the resolution can be less and often does not normally cover as large a region as in the case when a matrix is used.

The collimator 30 according to the invention, which can be placed before the detection unit 20, reproduces the radiation substantially in dot form on said detector elements and can thus provide high measuring accuracy. In this manner, the problem which otherwise arises when the incident radiation is guided through a slot, i.e. that the radiation is deflected and the radiation is dispersed into the surrounding air, is avoided. A collimator 30 can be in the form of a circular opening, which, for example, can have a diameter of between 0.1 and 0.2 mm, preferably 0.5 to 1.5 mm and most preferably 1.0 mm. It is also possible to make use of other shapes of the collimator 30, such as a circumscribed polygon opening, for example triangular, quadratic, hexagon, etc.

In the event that a plurality of collimators 30 is used, these can be arranged in parallel before a matrix or vector of detector elements in order to, for example, be able to determine the resolution capability, modulation transfer function and focus size. The number of collimators can vary between 10 to 100, preferably between 30 and 70 and most preferably 50. The size of the detector elements can vary between 10 μm to 1.0 mm, preferably between 0.1 mm to 0.9 mm and most preferably between 0.25 mm and 0.50 mm. The size of the collimators is generally somewhat smaller than the detector elements. The measuring which takes place in the detector elements with the help of a plurality of collimators 30 can be carried out in such a manner that, when X-ray radiation impinges the collimators 30, the radiation continues through the collimators and is detected during a certain period of time (for example between 20 to 1000 ms) by the detector elements which are located thereafter. The detector elements then send these signals further by means of out-putting the signals, for example with the help of a shift-register, to the ADC 40 and further to a memory (not shown) which is either external of, or internally connected to, the processing unit 50 in order to be able to determine an intensity curve, also known as line-distribution function. From the line-distribution function, the resolution FWHM, (Full Width at Half Maximum), FWTM, (Full Width at Tenth Maximum) and the Fourir transform of the line-distribution function (MTF), etc. can be obtained using a calculation algorithm which per se is known and will not therefore be described further. The resolution can be obtained by measuring the half width of the line-distribution function, i.e. FWHM (Full Width Half Maximum).

Instead of using a plurality of detector elements in front of a plurality of collimators 30, it is possible to utilize only one detector element which, for example, is arranged on a rail equipped with a step motor connected to some form of control electronics. In this manner, the detector element can be displaced transversely and achieve the same results as if a plurality of detector elements were used. In a corresponding manner, only one collimator 30 can be used on a displacement plate. A third imaginable variant can be that only one collimator 30 and one detector element are displaceably arranged in order to obtain a movement in the transverse direction to obtain the same result as when a plurality of detector elements is used.

In the case where it is desirable to use only one collimator 30, which can also be termed as a single collimator, it can be sufficient to arrange this in front of only one detector element in order, for example, to be able to determine the X-ray spectrum, absorbed radiation dosage, maximum tube voltage across the X-ray tube 10, exposure time, filtering of the radiation, the dosage velocity from the X-ray tube 10, as well as the condition of the X-ray tube 10 and X-ray generator. The measuring which takes place in the detector element with the aid of the single collimator 30 can take place in such a manner that the intensity of the radiation is measured during the entire exposure of X-rays. The intensity can be measured during short periods of time, preferably between 0,1 to 10 μs, more preferably between 1 to 5 ps. After the measuring, the values from the detector element can be sent to the ADC 40 and further to a memory, for example a buffer memory which sorts the signals with regard to energy content. The memory can either be placed externally or internally in the processing unit 50.

One of the primary functions of the processing unit 50 is to analyse/process the information which is received from each detector element. In addition, the processing unit 50 can be provided with visualisation means 60 which, for example, can be in the form of a screen and/or a display on which the various parameters which have been mentioned above can be presented.

The information which enters the processing unit 50 from the detector unit will be stored in an electronic memory, processed using software and presented for example in the form of various diagrams, various indications, numerical values, etc.

In the processing unit 50, it is for example possible to register the quantity of energy which is emitted from the X-ray tube 10, the tube voltage of the X-ray tube 10, the appearance of the X-ray spectrum, the resolution capability of the X-ray tube 10, the exposure time, etc. It is also possible to analyse discontinuities in the X-ray spectrum.

Figure 2:
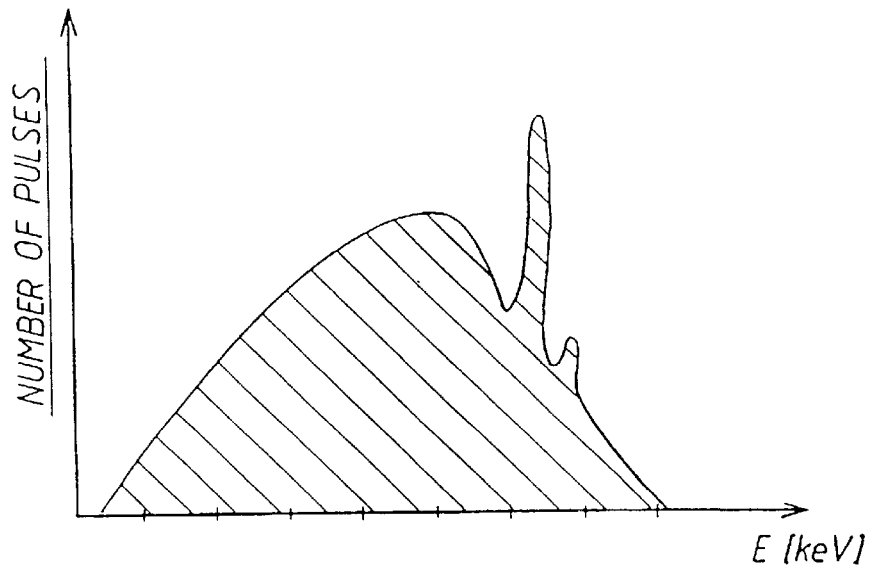
FIG. 2 shows a spectrum from an X-ray tube.

In order to be able to determine, for example, the exposure time, the time can be measured from the first photon being registered in a detector element which is provided with a single collimator 30 to a point when no radiation is detected any longer. The maximum tube voltage across the X-ray tube 10 can be obtained by extracting the highest energy from the X-ray spectrum, see also FIG. 2. The dosage velocity from the X-ray tube is proportional to the area under the X-ray spectrum and can be calibrated, see also the dashed portion in FIG. 2. The function of the X-ray tube 10 and the X-ray generator can be analysed from the appearance of the spectrum, inter alia it is possible to study the appearance of the low energy portion of the spectrum as well as whether the spectrum contains any discontinuities.

Figure 3:
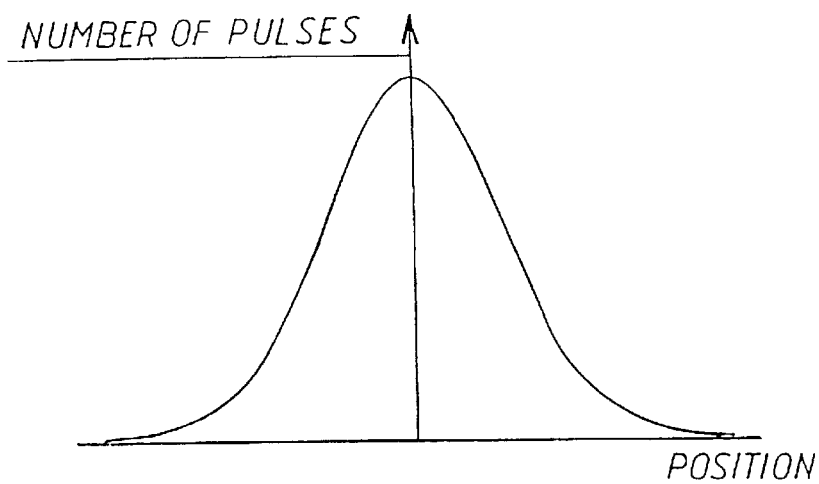
FIG. 3 shows a diagram of a line distribution function in an X-ray tube.
Figure 4:
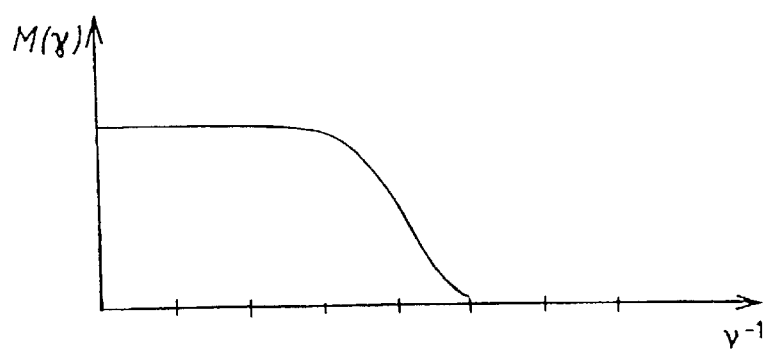
FIG. 4 shows a diagram of the Fourier transform of the line distribution function in FIG. 3.

The resolution capability of the X-ray tube 10 can be obtained by the half-width of the single signal intensity under the single collimators in the detector elements (so-called line-spreading function LSF), see also FIG. 3. The modulation transfer function which denotes the total frequency resolution capability of the X-ray equipment can be obtained from the Fourier transform of LSF, see also FIG. 4.

Figure 5A:
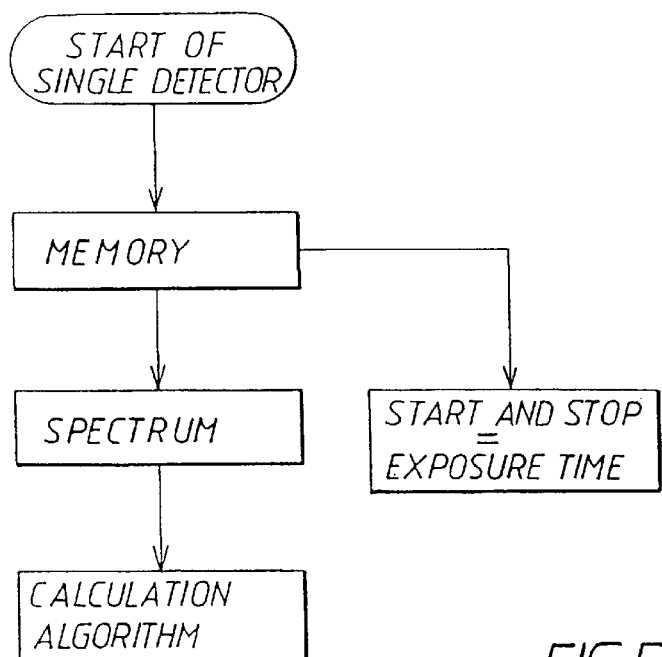
FIG. 5a shows a flow diagram for a single detector.

An example of a flow diagram of a single detector is shown in FIG. 5a. The single detector in this case relates to a measuring with a single collimator 30. The measuring is carried out in such a manner that when the X-ray radiation impinges on the single collimator 30, the radiation continues through the single collimator 30 and is registered by the detector which is located thereafter. The detector then sends signals to a memory which is either externally or internally connected to the processing unit 50 in order to be able to determine an exposure time as well as to calculate the spectrum across the X-ray tube 10. The exposure time in this case is the time the detector is exposed, i.e. the time between start and stop. The absorbed dosage, the condition of the X-ray tube, the maximum acceleration voltage [kVp], the lowest energy in the spectrum, etc., can then be obtained from the spectrum using a calculation algorithm which is known per se and will not therefore be described in greater detail. Absorbed dosage in this case is the area which is formed beneath the spectrum, i.e. the area which is delimited between the axis in FIG. 5b, termed Intensity and E [keV] (E=energy). The processing unit 50 should be able to be calibrated against this absorbed dosage by comparing the surface of the area under the spectrum against one or more known absorbed dosages. The condition of the X-ray tube 10 is determined by calculating the gradient of the spectrum and this ought to be able to be calibrated in the processing unit 50 by comparing the gradient of the low energy portion of the spectrum against reference values from new X-ray tubes. The total filtration of the X-ray radiation can be determined by determining the lowest energy which is present in the spectrum. The lowest energy should be able to be calibrated in the processing unit 50 against total filtration. The filtration means a metal which can be placed between an X-ray tube and an object, for example a woman's breast, a detector element, or similar. The filter can be in the form of one or more metals such as, for example, aluminium, molybdenum, rhodium, copper or similar.

Figure 5B:
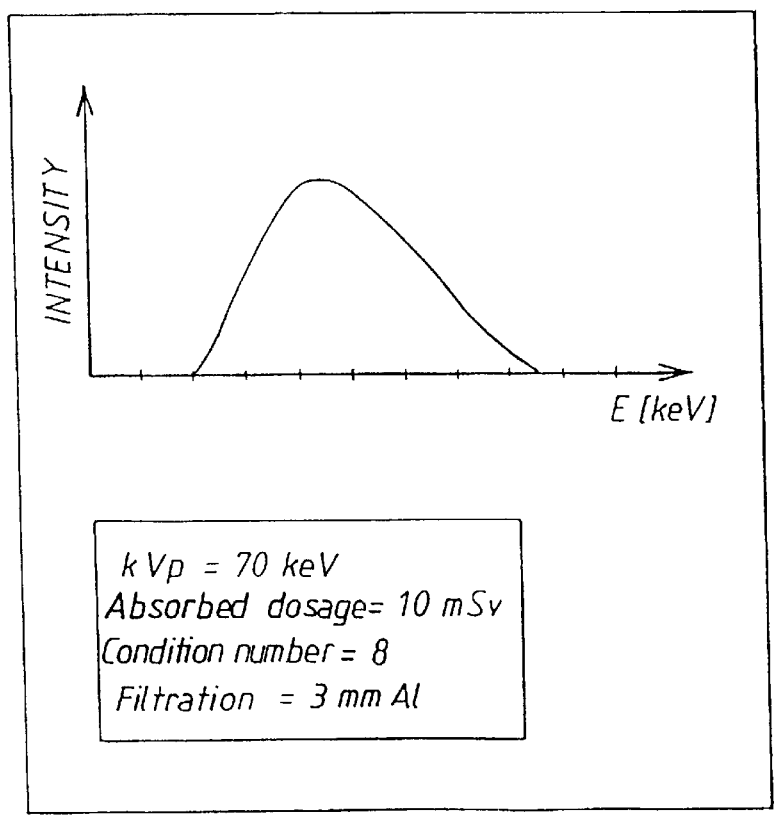
FIG. 5b shows a presentation of the result which is obtained from the single detector.

FIG. 5b shows an example of how a presentation of the result which is obtained from the single detector, i.e. the spectra and calculated parameters of the X-ray tube 10, via visualization means 60 which for example can be in the form of a screen and/or a display. This visualization means can be incorporated in the processing unit 50. The energy (E) in the diagram is shown in keV, the maximum acceleration voltage in keV, the absorbed dosage in mSv and the filtration in mmAl.

Figure 6:
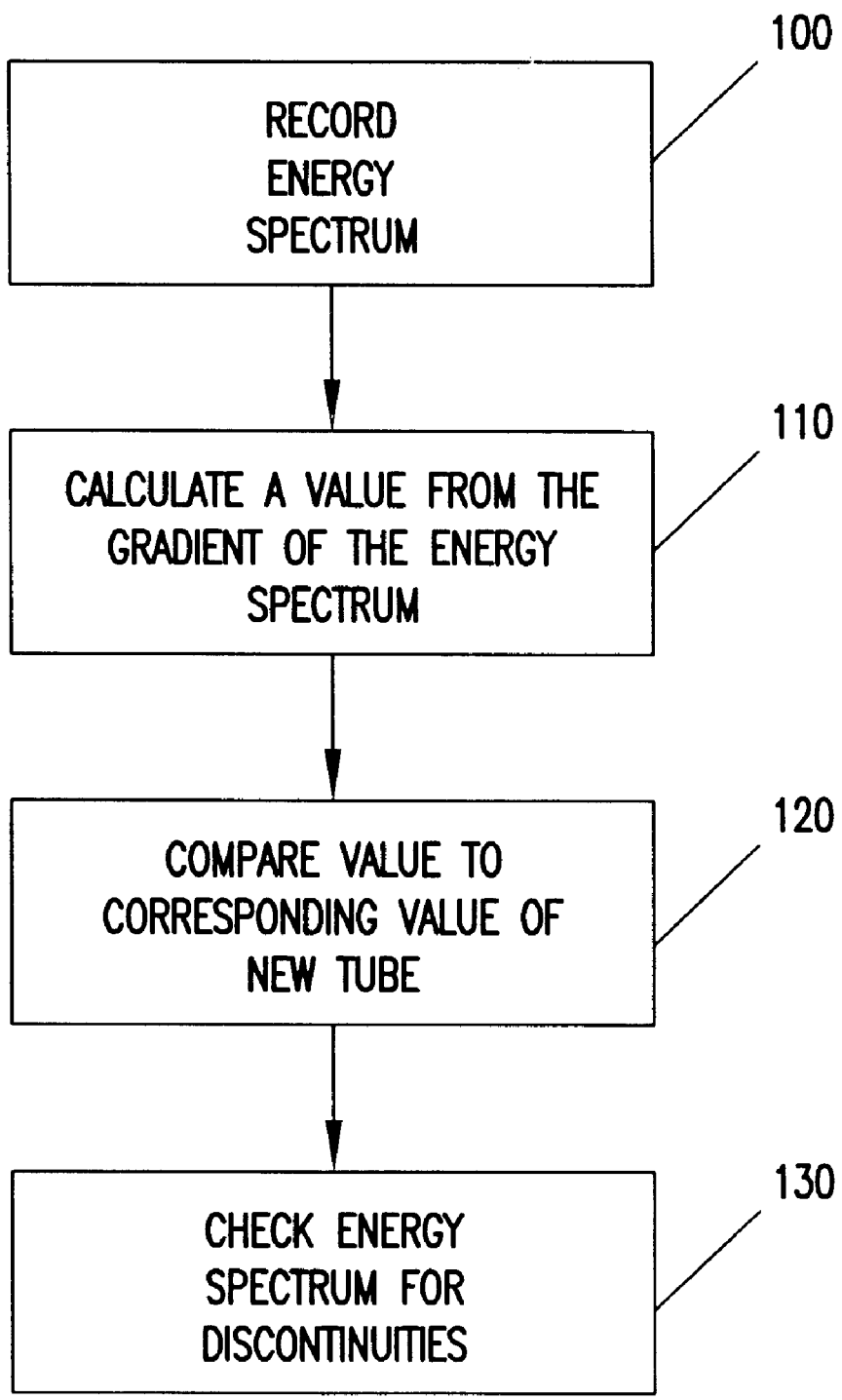
FIG. 6 is a simplified flowchart illustrating a method of determining the condition of an X-ray tube according to a preferred embodiment of the invention.

FIG. 6, which is a flowchart, illustrates a preferred embodiment of the invention. The fist step of a preferred method occurs at block 100, in which the energy spectrum of an X-ray tube is recorded. Preferably, the tube has been in use for some time prior to testing. The method continues at block 110, where a value is created from the gradient of the energy spectrum recorded at block 100. This value is compared at block 120 to the corresponding value of a new X-ray tube. Block 130 shows an optional step in which the energy spectrum is checked for discontinuities by comparing the energy spectrum of the X-ray tube tested with the energy spectrum of a corresponding new X-ray tube.

Although the shown embodiments in the present invention have been described in detail with reference to the attached drawings, it is to be understood that the invention is not restricted to these specific embodiments and that various modifications can be made by a skilled person without departing from the scope defined by the appended claims. For example, the detector elements do not have to be in the form of semi-conductor detectors but can also be in the form of, for example, a photographic film.

What is claimed is:

1. Method for determining the condition of an X-ray tube after a certain operating time, the method comprising steps of:

recording an energy spectrum of the X-ray tube, calculating a value from a gradient of a curve of the energy spectrum in its low-energy region, and comparing the aforementioned value with a corresponding gradient value of an energy spectrum curve calculated from a new X-ray tube.

2. Method according to claim 1, further comprising a step of comparing the energy spectrum curve for the X-ray tube that has been operating for a certain time with that for the new tube with regard to the existence of discontinuities.

3. Method in claim 1, wherein the X-ray tube that has been operated for a certain time is the same as the new tube.

4. Method in claim 2, wherein the X-ray tube that has been operated for a certain time is the same as the new tube.

5. Arrangement for an X-ray tube in order to determine its condition after a certain operating time, the arrangement comprising:

a detector connected to a calculating unit that can be inserted into the radiation beam of the X-ray tube, wherein the detector is designed to generate a signal in response to an instantaneous intensity of the X-radiation, and the calculating unit is designed to calculate an energy spectrum from the aforementioned signal, the energy spectrum defined as a number of X-ray pulses of the X-ray tube as a function of a voltage across the X-ray tube, wherein the the arrangement comprises a memory capable of storing an energy spectrum obtained from the radiation from a new X-ray tube, as well as a comparison arrangement designed to compare the energy spectrum curve from the new tube as well as from the tube that has been operating for a certain time.

* * * * *

UNITED STATES PATENT AND TRADEMARK OFFICE
CERTIFICATE OF CORRECTION

PATENT NO.    : 6,142,668
DATED         : November 7, 2000
INVENTOR(S)   : Kullenberg et al.

It is certified that error appears in the above-identified patent and that said Letters Patent is hereby corrected as shown below:

Title page,
Item [54], "X-RAY MULTIMETER" should read -- METHOD AND APPARATUS FOR DETERMINING THE CONDITION OF AN X-RAY TUBE --.

Column 4,
Line 6, "0.2. mm" should read -- 2.0 mm --.

Column 5,
Line 1, "1 to 5 ps." should read -- 1 to 5 µs. --.

Column 8,
Line 1, delete duplicate "the".

Signed and Sealed this

Ninth Day of April, 2002

*Attest:*

*Attesting Officer*

JAMES E. ROGAN
*Director of the United States Patent and Trademark Office*